United States Patent [19]
Luhn et al.

[11] Patent Number: 6,105,354
[45] Date of Patent: Aug. 22, 2000

[54] RAKE APPARATUS

[76] Inventors: Harold R. Luhn, 520 Koehn Rd., Bellville, Tex. 77416; Luther J. Hueske, P.O. Box 1894, Brenham, Tex. 77834-1894

[21] Appl. No.: 09/327,203

[22] Filed: Jun. 7, 1999

Related U.S. Application Data

[63] Continuation of application No. 08/638,427, Apr. 26, 1996.

[51] Int. Cl.[7] ................................................. A01D 78/00
[52] U.S. Cl. ............................... 56/385; 56/341; 56/370; 56/396; 56/2
[58] Field of Search .............................. 56/375, 376, 377, 56/378, 384, 385, 396, 341, 350, 354, 423, 370, 380

[56] References Cited

U.S. PATENT DOCUMENTS

| | | | |
|---|---|---|---|
| 1,044,744 | 11/1912 | Caswell | 280/410 X |
| 1,219,368 | 3/1917 | Bereth | 280/410 X |
| 4,077,189 | 3/1978 | Hering | 56/377 X |
| 4,078,366 | 3/1978 | Carmichael | 56/377 |
| 4,184,558 | 1/1980 | De Buhr et al. | |
| 4,214,428 | 7/1980 | Caraway | 56/377 X |
| 4,478,032 | 10/1984 | Inskeep | 56/377 |
| 4,523,771 | 6/1985 | Bender | 280/410 X |
| 5,127,217 | 7/1992 | Fell et al. | 56/341 |
| 5,305,590 | 4/1994 | Peeters | 56/384 X |
| 5,313,772 | 5/1994 | Tonutti | 56/384 X |
| 5,400,578 | 3/1995 | Galanti | 56/341 |
| 5,404,702 | 4/1995 | Lewis | 56/365 |
| 5,412,929 | 5/1995 | Urbain et al. | 56/367 X |
| 5,685,135 | 11/1997 | Menichetti | 56/380 |

FOREIGN PATENT DOCUMENTS

| | | |
|---|---|---|
| 94/10828 | 5/1994 | Australia . |
| 1453826 | 10/1976 | United Kingdom . |

*Primary Examiner*—H. Shackelford
*Attorney, Agent, or Firm*—The Matthews Firm

[57] ABSTRACT

A new and improved rake apparatus and methods are provided for the easy and safe exchange of process equipment towed behind the rake for combined raking and processing agricultural operations. The rake may be mounted on a large frame with a substantial extension PTO shaft capable of transferring power from the power source (usually a tractor) to a baler, fluffer rake, or other towed farm implement attached to the end of said frame, through connection to a tractor's PTO shaft via the use of a telescopic PTO shaft. Once connected to the power source, one has a combination of a rake having mounted swing arms that extend outwardly from the framed device and a PTO shaft driving the baler, tedder rake, or other towed farm implement, enabling the rake to swing hay and other cut materials into the path of the towed implement for further processing. A load-bearing rear wheel assembly is provided to support the rake off the ground to facilitate the safe and easy exchange of processing equipment towed by the rake with hindering the operation of wheels or the rake.

22 Claims, 6 Drawing Sheets

FIG. 6

RAKE APPARATUS

This is a continuation of co-pending application Ser. No. 08/638,427, filed Apr. 26, 1996.

FIELD

This invention relates generally to a self-contained, pullable rake wherein the rear of the rake is adapted to further interchangeably pull behind the rake a variety processing equipment, such as balers of different types or a fluffing or tedder rake. The rake provides a wheel assembly whereby pulling the rake frame is facilitated and which also supports the frame for easy interchangeability of the processing equipment. Methods for performing combined raking and processing operations are also disclosed.

In particular, the apparatus comprises a self-contained frame and a large rear wheel assembly, both of which are mounted with a winged rake whereby the rake's arms optionally swing out for use by means of, for example, a hydraulically driven mechanism, to drive grass or hay back beyond the frame which can tow a selected hay processing implement such as a baler, into the input feed area of a baler which is interchangeably attached to and immediately behind the rake. The rake arms may also be optionally closed for storage or for towing the apparatus to the site to be raked.

The baler is propelled by the rake's power take off, which is connected to the tractor's power take off through a driveline mounted on said frame, such that one has a combination rake/baler apparatus which not only eliminates the use of a tractor but also integrates the hay or other grass cutting and baling operations, resulting in a substantial savings in time, money and effort expended on labor intensive farm operations.

BACKGROUND

The process of raking and baling hay or other grasses is a time intensive one, ordinarily requiring at least two passes over the cut hay and the use of up to two tractors and operators. In the event the raked hay is wet and not quite ready for baling, a tedder or fluffer rake is often used to fluff the raked hay, introducing a third step into the operation of processing the cut hay and possibly another tractor and operator.

The time involved in performing the above operations is significant and leads to increased costs that must be shouldered by the farmer who is, in almost all cases, carefully watching his or her bottom line. Efficiency and cost savings are therefore of paramount importance.

While prior users have combined the raking and baling operations such that they may be accomplished in one pass, nobody has combined those two operations such that no modifications whatsoever are required to either the tractor or the baler. In fact, while prior users have addressed the problems associated with the time and effort involved in making more than one pass over a field to gather and otherwise process the cut hay, none of those users have been able to achieve the efficiency, ease of operation, and cost savings associated with the current inventive device.

In acknowledging and attempting to address die problems associated with gathering and baling hay and other grasses, the bottom line to the farmer seems to have been overlooked in all the prior art. The various efforts at combining the raking and baling operations have either taken the form of attaching the rake mechanism to the baler., or attaching the rake arms to the tractor, wherein the baler is towed by the tractor and operates in the normal manner. Both of the foregoing approaches, however, are plagued with either or all of the following: a high initial investment, reduced flexibility and a high risk safety factor.

The primary disadvantage of attaching the rake to the tractor is that once the rakes are attached to the tractor, they are not easily removable and the usefulness of the tractor for other farming operations while the rakes are attached is significantly diminished. Furthermore, regardless of whether the rake arms are attached to the front end of the tractor or are mounted between the front and rear wheels of the tractor, an excessive amount of dust is created during the raking process, creating problems such as reducing the operator's visibility, health, increasing the operator's fatigue, obstructing parts vital to the tractor's proper performance and generally leading to a host of other dust related problems.

The primary disadvantage associated with merely retrofitting the baler to accept the attachment of a rake mechanism is that the operator is limited to using the specific type of baler that has been retrofitted to accept the rake. Furthermore, once attached to the baler, removal of the rake from the baler necessarily involves the use of overhead lifting devices or similar equipment. As such, the operator's flexibility is greatly diminished insofar as swapping out different types of balers (round, square, etc.) or merely attaching other hay processing equipment to the rake mechanism, such as a tedder rake for fluffing the raked hay, prior to baling, or using the rake in its original configuration.

U.S. Pat. No. 5,404,702 ('702) issued Apr. 11, 1995 to Lewis for a "Retrofittable Wide Windrow Apparatus" discloses a pullable rake having a baler attached to the rear of the rake. The disclosure is principally directed to a baler permanently attached to the rake, but the specification does disclose that the baler may be removably attached to the rake. Lewis, however, fails to provide the advantages of the present rake apparatus. For example, removable does not equate to interchangeability. Removable includes cutting the baler away from the rake, which would destroy any capacity to re-attach the baler, attach a different baler, or attach a different piece of processing equipment.

Further evidence that removability does not equate to interchangeability is revealed by the structure of the Lewis rake. The frame of the Lewis rake is not provided with wheels or any other structure which supports the frame, and more importantly supports a rear hitch, off of the ground after the baler has been removed. Thus, once the baler is removed, the rear of the frame drops to the ground, exerting undesirable strain on the frame attachment to the tractor, and damaging the attachment mechanism of the frame to the tractor. Removing the Lewis baler requires the frame to be lifted up in order to re-attach the baler. Manually lifting the frame to re-attach the baler is difficult, if not physically impossible, requiring another piece of equipment such as a winch or a crane to lift the frame into position for re-mounting the baler. It is clear that removing the baler from the Lewis rake does not facilitate exchanging the baler for another type of baler or a different piece of processing equipment.

Lewis discloses rake arms equipped with small wheels to facilitate pulling the rake arms with the frame, but the location of the wheels is proximate to the tractor hitch, not the baler attachment. Further, the wheels are attached to the rake arms, not to the frame. The arm wheels of Lewis do not provide adequate support to the frame to facilitate interchanging the baler with another piece of equipment.

U.S. Pat. No. 5,685,135 ('035) issued Nov. 11, 1997 to Menichetti for a "Pull Type V-Rake" discloses a pullable rake having weight bearing wheels attached to a transverse element at the rear of the rake. The Menichetti rake does not provide any means for attaching processing equipment behind the rake. Further, the rear wheels of Menichetti are not adapted to accommodate processing implements having different sizes and configurations towed behind the rake.

Neither the '702 nor the '035 patent is concerned with providing interchangeable processing equipment to the rake. This is evident from the lack of structural elements, in either patent, to provide for exchanging selected processing implements, together with the lack of any teaching, suggestion, or motivation to provide for interchangeability of processing equipment.

SUMMARY OF THE INVENTION

It is therefore an object of this invention to provide unprecedented flexibility in hay raking to permit raking alone or combining raking with either a baling or tendering process. The apparatus' ease of use, coupled with its ruggedness and economy, make it an economical alternative to the customary multi-pass process of raking and subsequently baling hay, offering a more economical, practical, and safer alternative to the prior art described above.

The inventors have recognized the limitations of the prior art and have devised a raking apparatus that can be used in conjunction with either a tractor driven baler (regardless of the type of baler) or other hay processing equipment, such as a tedder or fluffer rake. This combination is achievable with no modifications to either the tractor, baler, or other hay processing equipment used in conjunction with the raking apparatus, thereby making this combination truly unique and useful due to the efficiency, economy and ease of use of the present invention.

The apparatus of the present invention generally consists of a large extension frame with sufficient strength to support raking only, or to rake and tow a baler or other hay processing equipment, as well as to support ancillary equipment for powering the mentioned rake and processing equipment. In addition, the present invention consists of a large rear wheel assembly with sufficient strength to support a raking apparatus and enable the safe towing of a baler or other hay processing equipment.

The frame is designed to include a heavy support hitch on each of its front and rear ends, an extension Power Take Off ("PTO") shaft extending from the front of the frame to the rear, wherein said extension PTO shaft is supported by multiple bearing mounts mounted with said frame, a series of protective safety shields enclosing the extension PTO shaft, and several mounts for connecting a raking mechanism to the frame. Further attached to the frame is a storage bracket for supporting a telescopic PTO shaft wherein said bracket has a means for securing said telescopic shaft and wherein said telescopic shaft is attached at one end to the extension PTO shaft mentioned above.

The rear wheel assembly replaces the wheel assembly normally associated with a raking apparatus and is designed to include heavy tires, wheels and spindles, and is wide enough to provide enough clearance to allow the towing of a baler or other hay processing equipment behind the frame. The rear wheel assembly is positioned to support the rake off the ground in the absence of a piece of equipment being attached to the rake to facilitate exchanging one piece of equipment for another. Additionally, the rear wheel assembly is adapted to provide adequate clearance from the rake to accommodate a wide variety of equipment dimensions and configurations behind the rake without interfering with the operation of the rake or the wheels.

An electric wire harness extending the length of the frame enables taillights, work lights and safety lights mounted on the baler or other towed hay processing equipment to be hooked up to the tractor's power supply. Another electric wire harness is also provided for instances wherein the towed farm implement utilizes monitoring devices requiring electrical power.

To operate the system, the support tongue on the front end of the frame attaches to the tractor's draw bar, while the tractor's power take off is coupled to the extension PTO shaft through the telescopic PTO shaft. The baler or other hay processing equipment is attached to the hitch at the rear end of the frame, and the telescopic PTO shaft of the baler or other hay processing equipment is subsequently attached to the end of the extension PTO shaft mounted with the frame. The hydraulic power and electric service lines, through their respective harnesses, are attached to the proper ports on the tractor on one end and to the proper ports on the rake, baler, or other hay processing equipment on the other.

When the above are so connected, both the rake mechanism and the baler or other hay processing equipment operate in the identical manner as if they had been used separately and as part of the normal multi-pass method of raking and baling hay. The raked hay is gathered in the normal V-shape and fed to the center of the frame enabling the towed implement to process the gathered hay in the normal manner, or, if desired, the rake can be operated in its original configuration.

DETAILED DESCRIPTION OF THE DRAWINGS

Figure 1:
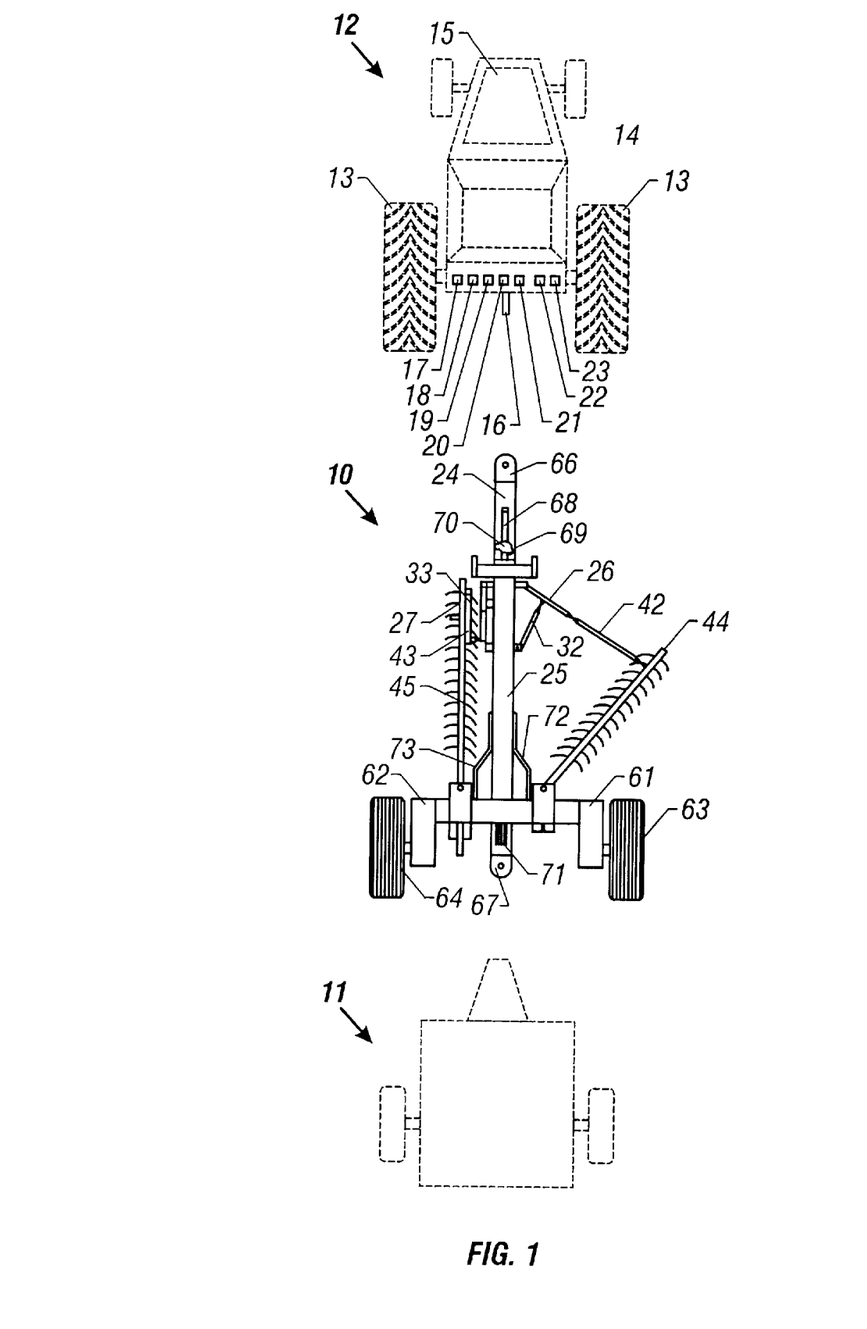
FIG. 1 is a trip plan view of one embodiment of the present inventive device.

The rake apparatus of the present invention is generally illustrated in FIG. 1 by the numeral 10, while a baler apparatus is generally illustrated by the numeral 11 and a tractor's apparatus by the numeral 12. Baler 11 is merely illustrative of the type of towed implement that may be towed by the present inventive device and is not intended to be limited to only a baler.

The tractor of the present invention, generally illustrated by the numeral 12, is a substantial but conventional type tractor including tractor wheels 13 as illustrated, draw bar 9 and a tractor body 14, wherein said tractor 12 is powered by a motor 15 and includes a conventional PTO 16. Also included on tractor 12 are multiple conventional hydraulic power points which, for the purposes of this description, will be limited to 17, 18 and 19, while the multiple conventional electrical power points, also shown on tractor 12, will be limited to those depicted in numerals 20 and 21. The above-numerated conventional hydraulic and electrical power points are merely illustrative of the number of such hydraulic and electrical power points normally found on conventional tractors such as that depicted by numeral 12 and are not intended to limit such points on the present invention. One skilled in the art will be knowledgeable with such hydraulic and electrical points on conventional tractors. The tractor's PTO shaft 16, in this instance, is ultimately coupled with the extension PTO shaft 69 as will be more fully illustrated hereinafter for the purpose of driving the baler apparatus it or any other towed implement requiring mechanical power.

Further shown in FIG. 1 is a substantial frame member 24, which makes up a very important part of this invention. The importance of frame member 24 will be more fully illustrated hereinafter. Mounted with frame 24 is frame 25 which is that of a conventional rake and attached thereto, toward the front end of frame 25, are linkages 26 and 27, which are connectable to rake arms 44 and 45 respectively, when said arms are extended to their operating positions.

Figure 5:
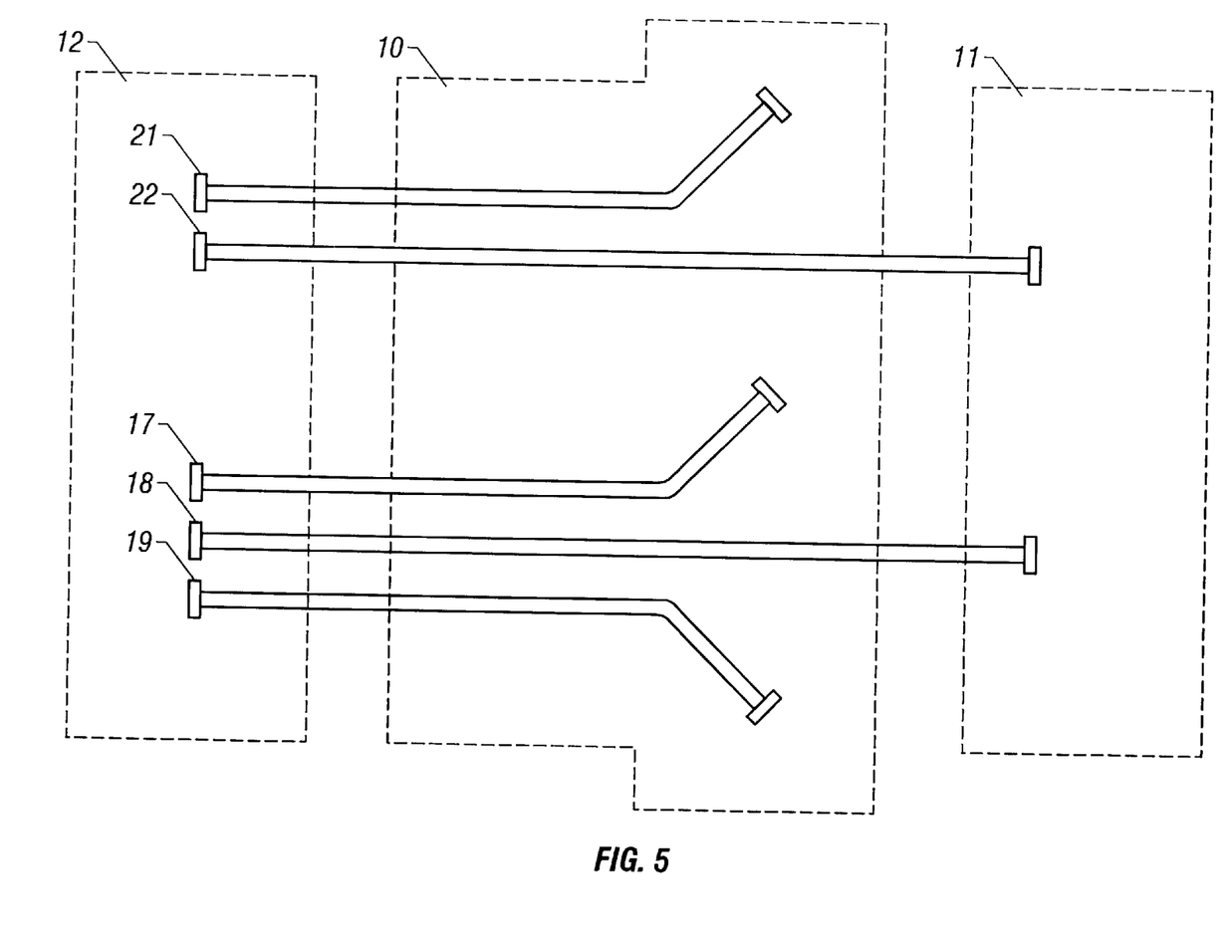
FIG. 5 is a schematic of the electrical harnesses and the hydraulic lines associated with the present inventive device.

Referring now to FIG. 5 extending along frames 24 and 25 are hydraulic lines 52, 53 and 54, which are of varying lengths and which are respectively connectable to the hydraulic power points 17, 18 and 19. Also extending along the entire lengths of frames 24 and 25 are electrical harnesses 57 and 58 which are similarly respectively connectable to electrical power points 20 and 21. Harness 57 serves to connect the various work and safety lights on baler 11 or on other towed implements to electrical power point 20, whereas harness 58 serves to connect any required monitors that may be used on said baler apparatus or on other towed implements to electrical power point 21. As with the number of conventional hydraulic and electrical power points mentioned above, the numbers associated with hydraulic lines 52, 53 and 54, as well as those associated with electrical harnesses 57 and 58, are merely illustrative of a multiplicity of hydraulic lines and electrical harnesses that may be used with the present invention and are not intended to limit in any manner whatsoever the number of hydraulic and electrical lines that may be utilized with the present invention. Extension power point 22 is also shown, wherein said power point is mounted on frame 25. Hydraulic line 54 serves to transfer hydraulic power to power point 22 through connection to power point 19 on one end, and to power point 22 on the other, thus allowing the free end of any hydraulic line on baler apparatus 11 or other towed implement to be connected to power point 22 for delivery of hydraulic power to such a baler or other towed implement.

Making up the rear wheel assembly of the rake and, as further shown by FIG. 1, are near vertical members 61 and 62, and wheels 63 and 64. Vertical members 61 and 62, in part, provide clearance from the wheels and the rake for the attachment of various pieces of processing equipment to the rake without hindering the operation of the apparatus. The rear wheel assembly, generally indicated by number 65 in FIG. 2, will be more fully illustrated hereinafter.

Connected to the front end of frame 24 is tongue 66, which tongue is connectable to draw bar 9, and hitch 67 on the rear end of frame 24. Also shown in FIG. 1 is telescopic PTO shaft 68, which is connected to extension PTO shaft 69. Finally, deflector assemblies 72 and 73 are shown in FIG. 1.

Figure 2:
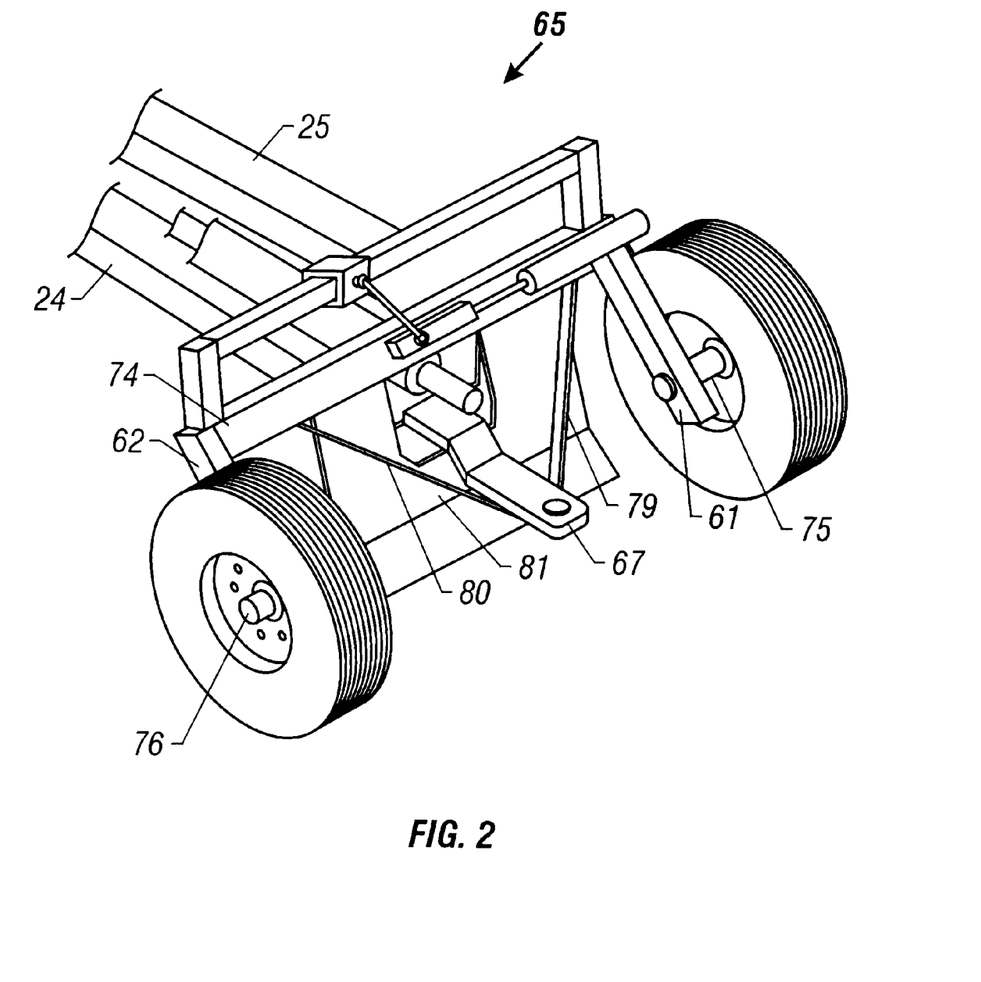
FIG. 2 is a perspective view of the rear wheel assembly of the present inventive device.

FIG. 2 shows generally, rear wheel assembly 65 and the manner of attachment of frame 25 to said assembly. Assembly 65 is composed of frame 74, to which near vertical members 61 and 62 are attached, whereby the inside angles formed by each of said members with frame 74 are identical and obtuse. Further shown are wheels 63 and 64 which are attached to vertical members 61 and 62 respectively, by spindle assemblies 75 and 76. Braces 79 and 80 are attached to frame 74 at a position proximate to near vertical members 61 and 62, which braces extend at an approximately 45° angle, to attach to both hitch 67 and frame 24 for additional support. Rear shield 70 is also shown, which serves to shield the part of extension PTO shaft 69 between bearing mounts 87 and 88.

Figure 3:
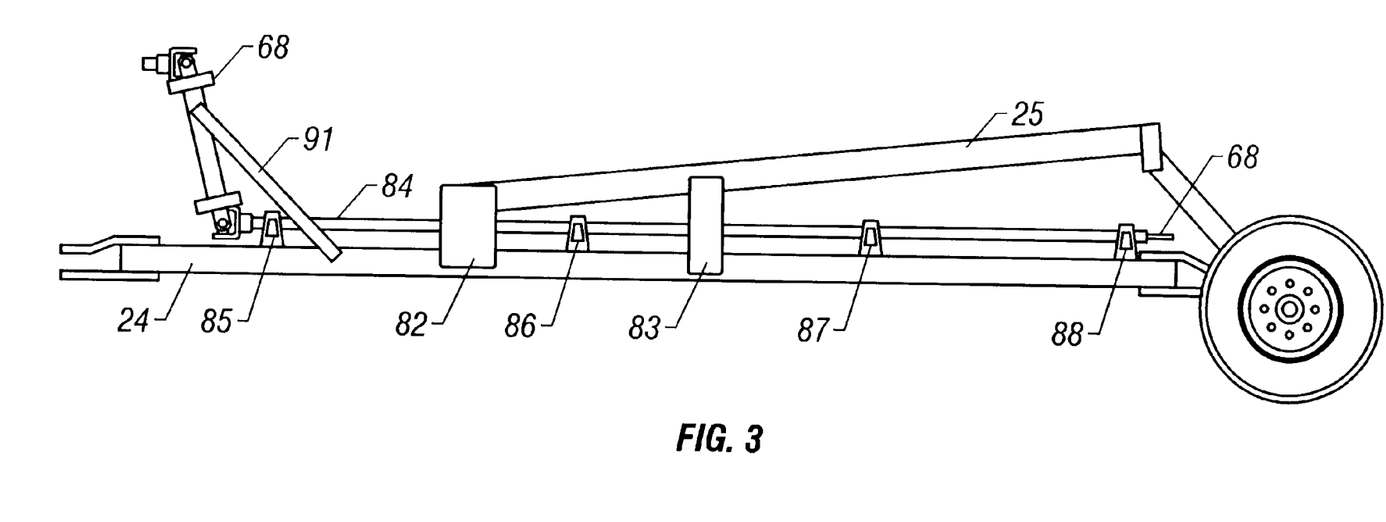
FIG. 3 is a side view of the present inventive device.

FIG. 3 presents a side view of the inventive device. Attached to frame 24 are multiple mounts which, for the purposes of this description, will be limited to mounts 82 and 83. These mounts are merely illustrative of the number of mounts that may be attached to frame 24 for the purposes of mounting frame 25 of the rake apparatus with frame 24, and are not intended to limit such mounts on the present invention.

Supporting extension PTO shaft 69 are multiple bearing mounts which, for the purposes of this description, will be limited to mounts 85, 86, 87 and 88. Once again, these mounts are merely illustrative of the number of mounts that may be attached to frame 24 for the purposes of supporting extension PTO shaft 69 and are not intended to limit such mounts on the present invention. The three safety shields 70 are shown, which shields are mounted between bearing mounts 85 and 86, 86 and 87, and 87 and 88. These shields are merely illustrative of the number of shields that may be utilized to protect both the operator and the extension PTO shaft, and are not intended to limit the number of such shields on the present inventive device.

Telescopic PTO shaft 68 is connected to extension PTO shaft 69 as shown. Bracket 91, also shown in FIG. 3, supports telescopic PTO shaft 68 when said telescopic PTO shaft is not in use. Said bracket will be further illustrated in FIG. 6.

Figure 4:
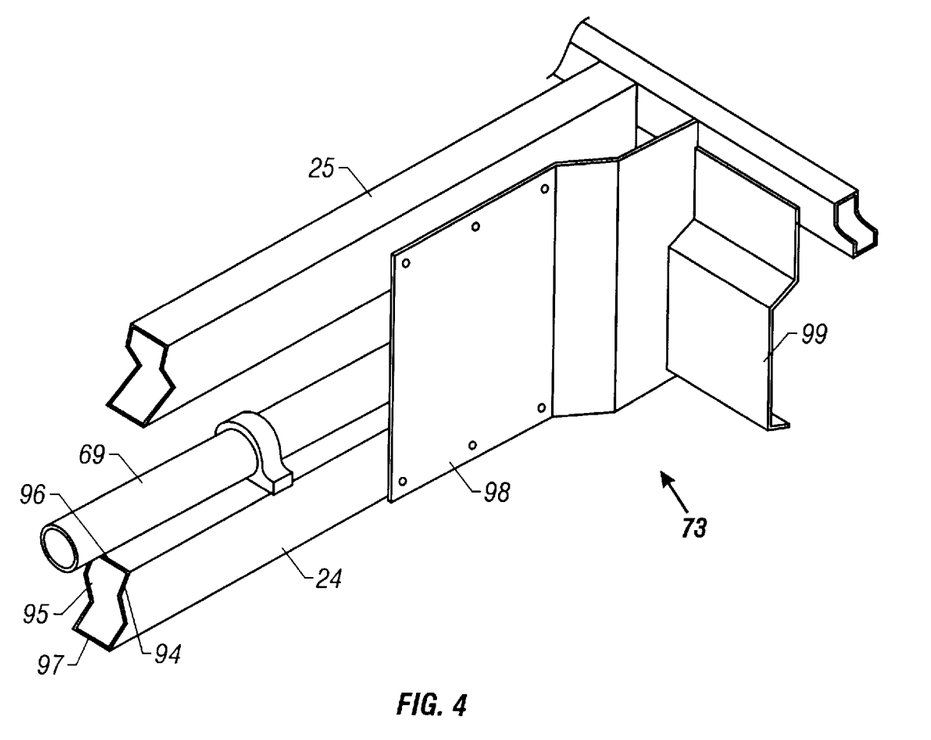
FIG. 4 is an enlarged side view of one of the deflector assemblies of the present inventive device.

As shown in FIG. 4, frame 24 of the present invention is a rectangular one with parallel longitudinal members 94 and 95, and parallel transverse members 96 and 97. This frame is merely illustrative of the various configurations of frames that might be used to accomplish the same result as the rectangular frame 24 depicted in this figure and is not intended to limit this frame to the configuration presented herein.

Attached to both frames 24 and 25 are deflector assemblies 72 and 73. While only assembly 73 is shown in this figure, assembly 72 is to be understood to be the mirror image of assembly 73. As shown in assembly 73, it is composed of deflectors 98 and 99. Once again, the deflectors on assembly 72 are identical to those shown as deflectors 98 and 99 in this figure. Deflector 98 is intended for attachment to both frames 24 and 25 at the indicated locations, whereas deflector 99 is intended to be attached primarily to frame 25. Deflectors such as 98 and 99 serve to ensure operator safety, to prevent hay or other grasses from wrapping around rotating components found toward the rear end of frames 24 and 25, and to further protect extension PTO shaft 69 from the grasses and hays propelled toward said shaft at the end of said frame.

FIG. 5 is a schematic showing the electrical harnesses and the hydraulic lines associated with the present inventive device. As shown in said figure, the free ends of hydraulic lines 52, 53 and 54 are connected to hydraulic power points 17, 18 and 19 respectively. Hydraulic extension power point 22 is also shown wherein the end of hydraulic line 54, which is not attached to hydraulic power point 19, is attachable to hydraulic extension power point 22. Similarly, electrical harnesses 57 and 58 are connectable to electrical power points 20 and 21.

Figure 6:
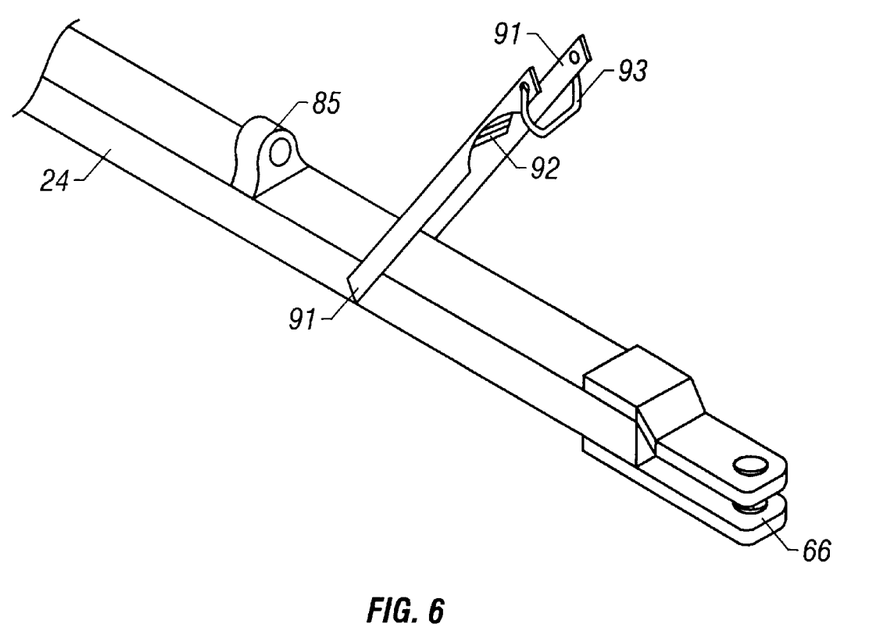
FIG. 6 is a perspective view of the support bracket for the telescopic PTO shaft.

FIG. 6 shows bracket 91 which serves to support telescopic PTO shaft 68 when said shaft is not in use. Bracket 91 is composed primarily of members 89 and 90, which are attached to frame 24 at identical angles, wherein the internal angle formed between each of said members and frame 24 is acute. Bracket brace 92 connects members 89 and 90 as shown, while securing means 93 serves to hold telescopic PTO shaft 68 in place when said shaft is not in use. Furthermore, front tongue 66 is shown, as is bearing mount 85, which is designed to support extension PTO shaft 69.

Operation of the present invention is relatively straightforward. The user begins by selecting an appropriate tractor with a power takeoff and with the appropriate number of hydraulic and mechanicals ports or points capable of supplying the necessary electrical and hydraulic power to both the rake and baler apparatus described above. Once the appropriate tractor is selected, frame 24 would then be hitched to tractor 12 by tongue 66 and secured by a locking mechanism, while the telescopic PTO shaft 68 would be disconnected from the bracket 91 and lowered from its stored position, such that it is connected to the tractor's PTO shaft 16.

Subsequently, the free ends of hydraulic lines 52, 53 and 54 will be connected to hydraulic power points 17, 18 and 19 on tractor 12, and the free ends of electrical harnesses 57 and 58 would be connected to electrical power points 20 and 21 on said tractor. The other ends of hydraulic lines 52 and 53 would subsequently be attached to the appropriate hydraulic points on rake arms 28 and 29 respectively, while the remaining end of hydraulic line 54 may be attached to extension hydraulic power point 22. Once so connected, the free ends of the electric lines on the towed implement which operate the safety and/or work lights on such implement may be plugged into the end of electrical harness 57, while the free ends of any connections on the towed implement, whose purpose is to supply electrical power to a monitoring device on such an implement, may be plugged into the end of electrical harness 58. Similarly, if the implement requires hydraulic power, the free end of the hydraulic line on the towed implement may be attached to extension hydraulic power point 22. The aforementioned connections of any hydraulic lines or electrical wire components to baler 11 or any other towed implement are to be connected after said baler or implement is attached to the hitch 67 and secured by a locking mechanism. Once tractor 12 has positioned the apparatus and baler 11 or any other towed implement at the desired location, the present invention is ready for use.

When the tractor's drive position is engaged, the baskets on the rake arms operate as intended, raking the previously cut hay or other grasses into a continuous windrow, setting the stage either for baler 11 to take in said hay or other grasses through its pick-up chamber, or for delivering such grasses to the tedder rake. In continuing around the field containing the cut grass or hay, the operator may proceed to rake and bale the hay, doing so in passes slightly overlapping each other. The operator is free to adjust all controls for the rake apparatus and the power apparatus through the appropriate control panels on tractor 12.

When work is completed on that specific field, the operator would disengage the tractor's power take off and cut off all power going to the rake arms. After the rake arms are brought into the closed position, the appropriate locking mechanism supplied with the conventional rake apparatus may be utilized to secure rake arms 28 and 29 in their closed transport position. In the event that a subsequent field needs to be processed, the above steps will be repeated until no further fields are left to be processed, or until the farmer is ready to return the rake apparatus and the towed implement to their storage locations. Once transported to their final storage locations, and the power supply is shut off, the towed implement would be disconnected from hitch 67 after removal of the appropriate locking mechanism and similarly, the rake apparatus may be disconnected from tractor 11 by removal of the appropriate locking mechanism associated with tongue 66. The above steps are to be performed only after disconnection of all electrical harnesses and hydraulic lines and after the removal of the telescopic PTO shaft from the tractor's PTO.

Other uses of the present inventive device will be apparent to those skilled in the art, such as the capability to swap out any towed implements, or even the tractor or the power supply, at any time during the processing of a certain field, according to the operator's preference. There are a number of minor changes that may be made to the preferred embodiment thus far described. For example, the present invention does not necessarily have to be connected to a baler apparatus. Instead, any tedder, fluffer rake or other hay processing type of equipment may be connected to hitch 67, or alternatively, the present invention may be used without any other implement connected to said hitch. Furthermore, it is contemplated that a hydraulic drive may take the place of the mechanical extension PTO shaft 69 and the rake mechanism may be driven by a hydraulic pump mounted on or about the said location of said extension PTO shaft.

Thus, this invention resolves the major problems left by the prior art, affording the operator unparalleled flexibility in the use of different farm implements in conjunction with the present device, thereby significantly speeding up raking and baling or fluffing times by reducing the number of passes required to accomplish the aforementioned tasks. Because no modifications are necessary to either the tractor or any of the towed implements, the present invention allows use of any farm implement that would ordinarily be towed, allowing for both mechanical or hydraulic operation of such towed implements.

The foregoing description should be construed as illustrative only of the principals of the invention. Numerous changes and modifications may easily come to the mind of those skilled in the art and it is not desired to limit the invention to the exact construction and methods shown and described. Accordingly, all suitable modifications and equivalents to the present invention may be resorted to and should be construed as falling within the scope of the instant invention.

What is claimed:

1. An improved rake apparatus comprising:
    a frame having sides, a front end, and a rear end,
    a rake mounted with the frame, the rake comprising arms optionally extendable from the sides of the frame;
    a front hitch attached to the front end of the frame for pulling the apparatus;
    a rear hitch attached to the rear end of the frame, whereby the hitch is adapted for interchangeably pulling a selected processing implement which may be attached to and pulled by the frame behind the rake, wherein said rear hitch further comprises a pivotal connection for pivotally connecting to said selected processing implement;
    at least one power transmitter having a first connector and a second connector; and
    a rear wheel assembly attached to the rear end of the frame and extending from the sides of the frame behind the rake, whereby the wheel assembly supports the frame off the ground in the absence of an attached implement to be pulled to facilitate the exchange of such implements, the wheel assembly further being adapted to facilitate the pulling of farm implements of varying dimensions and configurations without hindering the operation of the wheels or the rake.

2. The rake apparatus of claim 1, wherein the selected processing implement comprises a baler.

3. The rake apparatus of claim 2, wherein the selected processing implement comprises a square baler.

4. The rake apparatus of claim 2, wherein the selected processing implement comprises a round baler.

5. The rake apparatus of claim 1, wherein the selected processing implement comprises a fluffer.

6. The rake apparatus of claim 1, wherein said rear hitch further comprises:
a pin connection operable for receiving a tongue of said selected processing implement.

7. The improved rake apparatus of claim 1 wherein the power transmitter comprises a power take off.

8. The improved rake apparatus of claim 1 wherein the first connector of the power transmitter is adapted for connecting to a power take off on a tractor.

9. The improved rake apparatus of claim 7 further comprising a first hydraulic port integral with the tractor and a hydraulic service line having a first end and a second end, wherein the first end of the hydraulic service line is in fluid communication with the first hydraulic port, whereby hydraulic power may be routed to a second hydraulic port through the hydraulic service line by connecting the second hydraulic port to the second end of the hydraulic service line.

10. The improved rake apparatus of claim 7 further comprising at least one electric service line having a first wiring connector.

11. The improved rake apparatus of claim 10 further comprising a wiring harness operatively connected to the first wiring connector, the wiring harness at least one free end adapted for attaching to a second wiring connector.

12. The improved rake apparatus of claim 11 further the at second wiring connector is operatively connected to the attached implement.

13. An improved method for performing combined raking and processing operations, the method comprising:
providing a frame having sides, a front end and a rear end,
providing a rake mounted with the frame, the rake comprising arms optionally extendable from the sides of the frame;
providing a front hitch on the front end of the frame for pulling the frame;
providing a rear hitch which is pivotally connectable to said selected processing implement on the rear end of the frame, whereby the hitch is adapted for interchangeably pulling a selected processing implement capable of being attached to and pulled by the rear hitch behind the rake;
providing a rear wheel assembly attached to the rear end of the frame and extending from the sides of the frame behind the rake, whereby the wheel assembly supports the frame off the ground in the absence of an attached implement to be pulled to facilitate the exchange of such implements, the wheel assembly further being adapted to facilitate the pulling of farm implements of varying dimensions and configurations without hindering the operation of the wheels or the rake;
attaching a selected processing implement to the rear hitch;
connecting a power take off to an appropriate power transmitter connector on a tractor;
connecting the power take off to an appropriate power transmitter connector in the selected processing implement if required by the selected processing implement; and
pulling the apparatus comprising the rake and the selected processing implement, thereby raking and processing raked material in a combined raking and processing operation.

14. The method of claim 13, wherein the selected processing implement comprises a baler.

15. The rake apparatus of claim 14, wherein the selected processing implement comprises a square baler.

16. The rake apparatus of claim 14, wherein the selected processing implement comprises a round baler.

17. The method of claim 13, wherein the selected processing implement comprises a fluffer.

18. The method of claim 13, wherein the selected processing implement comprises a first processing implement, the method further comprising:
providing a first processing implement attached to the rear hitch;
detaching the first processing implement from the rear hitch;
providing a second processing implement; and
pulling the apparatus comprising the rake and the second processing implement, thereby raking and processing raked material in a combined raking and processing operation.

19. The method of claim 18, wherein the first processing implement comprises a fluffer, and the second processing implement comprises a baler.

20. The method of claim 18, comprising:
pulling the apparatus comprising the rake and the first processing implement prior to detaching the first processing implement, thereby raking and processing raked material in a combined raking and processing operation;
stopping the apparatus;
detaching the first processing implement from the rear hitch;
attaching the second processing implement to the rear hitch; and
pulling the frame comprising the rake and the second processing implement, thereby raking and processing raked material in a combined raking and processing operation.

21. The method of claim 20, wherein the first processing implement comprises a fluffer, and the second processing implement comprises a baler.

22. The rake apparatus of claim 13, further comprising:
providing that said rear hitch is operable for releasably receiving a tongue of said selected processing implement.

* * * * *